United States Patent [19]
Wirth, Jr. et al.

[11] Patent Number: 5,413,158
[45] Date of Patent: May 9, 1995

[54] RADIAL ARM SAW MORTISING ADAPTER

[75] Inventors: John Wirth, Jr., Dubois; Norris Shippen; Jay L. Sanger, both of Casper, all of Wyo.

[73] Assignee: Woodworker's Supply, Inc., Casper, Wyo.

[21] Appl. No.: 230,831

[22] Filed: Apr. 21, 1994

[51] Int. Cl.$^6$ ............................................. B27F 5/00
[52] U.S. Cl. ..................................... 144/72; 83/902; 144/73; 144/35 A
[58] Field of Search ............. 83/902; 144/35 R, 35 A, 144/72, 73; 30/371, 377, 382, 384, 385, 386

[56] References Cited

U.S. PATENT DOCUMENTS

| | | | |
|---|---|---|---|
| 1,170,120 | 2/1916 | Slonaker | 144/72 |
| 1,690,697 | 5/1927 | Palmu | 144/72 |
| 2,612,915 | 10/1952 | Moss | 144/72 |
| 2,621,686 | 12/1952 | Thompkins | 144/35 A |
| 2,645,255 | 7/1953 | Francescatti et al. | 144/22 |
| 2,682,898 | 7/1954 | Duc | 144/72 |
| 2,807,296 | 9/1957 | Stoll et al. | 144/72 |
| 3,056,439 | 10/1962 | Hall et al. | 144/73 |
| 3,080,897 | 3/1963 | Winter | 83/902 |
| 4,272,889 | 6/1981 | Scott et al. | 144/73 |
| 4,382,334 | 5/1983 | Reynolds | 144/73 |
| 4,470,438 | 9/1984 | Obreanu et al. | 144/72 |

*Primary Examiner*—W. Donald Bray
*Attorney, Agent, or Firm*—Cushman, Darby & Cushman

[57] ABSTRACT

A simplified mortising adapter for converting a conventional radial arm saw, or other power tool having an arbor, into a mortising tool. The adapter includes a base plate and a drive spindle rotatably mounted to the base plate for connecting to the radial arm saw or other power tool's arbor and driving a chain saw adjustably attached to the base plate. The drive spindle has a socket having a characteristic shape which is generally complementary to the shape of the arbor so that those components can be drivingly engaged. The adapter also includes a clamp mechanism for clamping the base plate to the power tool in a manner such that the base plate can be adjusted to concentrically align the drive spindle with the arbor when the base plate is clamped to the power tool.

19 Claims, 3 Drawing Sheets

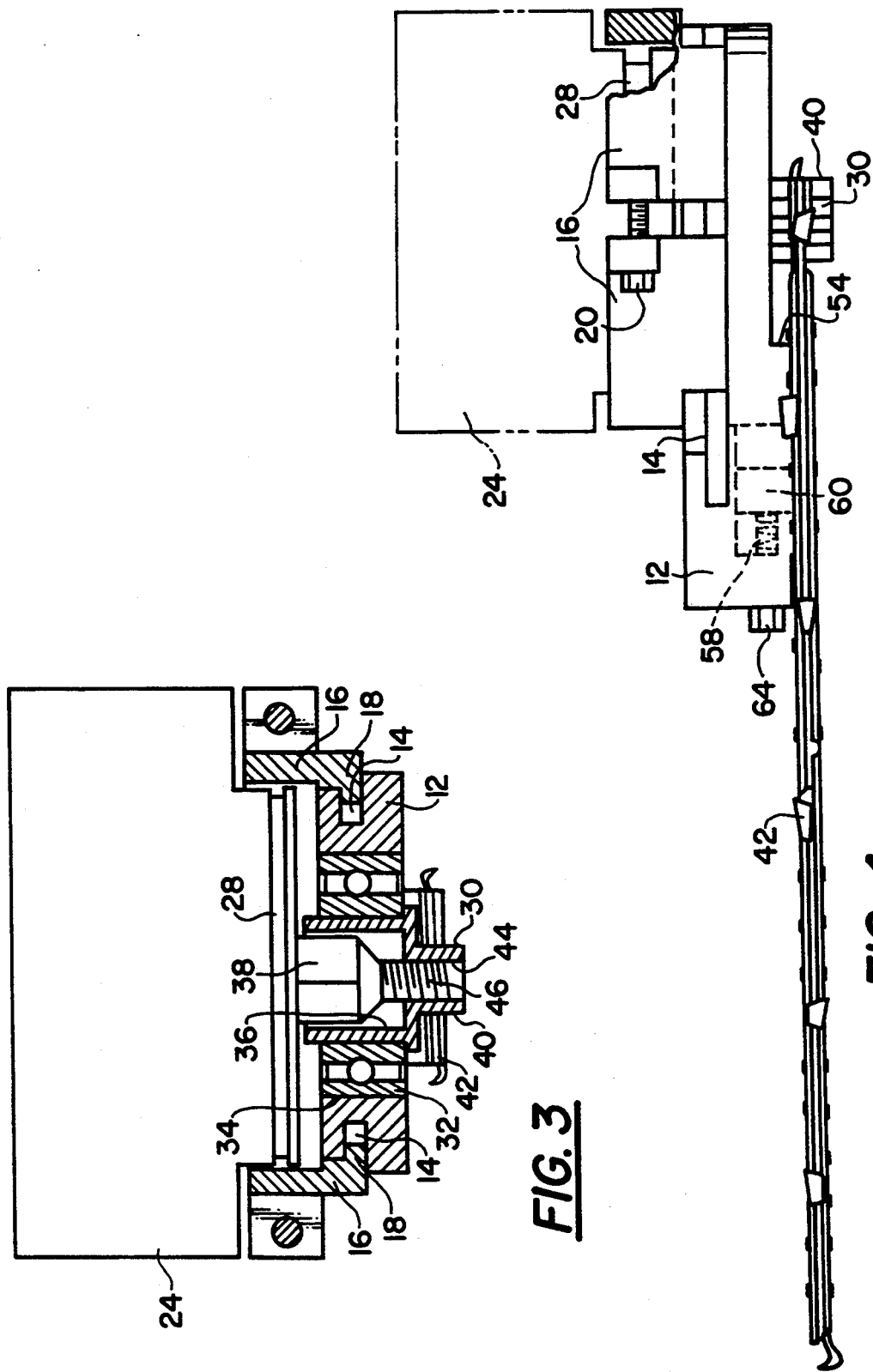

RADIAL ARM SAW MORTISING ADAPTER

BACKGROUND OF THE INVENTION

1. Field of the Invention

The present invention relates to the cutting of mortises in wood or other materials having similar machining characteristics by a powered tool and more particularly, to an improved adapter for converting a conventional radial arm saw to a mortising machine tool.

2. Description of the Related Art

A radial arm saw mortising adapter is disclosed in U.S. Pat. No. 4,470,438. This adapter utilizes a base plate to which a chain saw blade and chain saw can be attached. The base plate includes a fixed clamp bracket to which a clamp cap is bolted for clamping the mortising adapter to the housing of a radial arm saw. A driving spindle includes a hexagonal socket which fits over the hexagonal section of the radial arm saw arbor. The driving spindle is connected by a belt drive to a driven spindle which drives the chain saw. Because the clamp bracket is fixed, the bearing for supporting the driving spindle is mounted in a block which is slideably adjustable in the base plate so that the driving spindle can be adjusted to be concentric with the arbor when the mortising adapter is clamped to the radial arm saw motor. Slack in the drive belt is removed by mounting the bearing which supports the driven spindle in an adjustable eccentric mounting. The chain saw is tensioned by a standard tensioning bolt attached to the chain saw blade.

SUMMARY OF THE INVENTION

The principal object of the present invention is to provide a simplified mortising adapter for attachment to a radial arm saw. The mortising adapter of the present invention eliminates the intermediate driven shaft, belt and eccentric adjuster of the prior art, thereby reducing cost and complexity. The reduction of moving components also allows the mortising adapter to be more compact while increasing the strength and stability of the adapter during a mortising operation.

The present invention incorporates a base plate and a drive spindle rotatably mounted to the base plate for connecting to the radial arm saw arbor and driving the chain saw. The mortising adapter includes a pair of clamp brackets for clamping the base plate to the radial arm saw. Both clamp brackets are slideably adjustable along a flanged raceway on the base plate so that the base plate can be adjusted to concentrically align the drive spindle with the arbor when the base plate is clamped to the radial arm saw motor. The provision of two movable clamp brackets eliminates the need for an adjustable drive spindle bearing for aligning the drive spindle with the arbor. The chain blade is adjustable with an adjusting screw for tensioning the chain saw.

With the foregoing in mind, other objects, features and advantages of the present invention will become more apparent upon consideration of the following description and the appended claims with reference to the accompanying drawings, all of which form part of this specification, wherein like reference numerals designate corresponding parts and various figures.

BRIEF DESCRIPTION OF THE DRAWINGS

FIG. 3 is a sectional view as taken along line 3—3 in FIG. 1;

FIG. 4 is an elevational view of the adapter and chain saw of FIG. 1.

DETAILED DESCRIPTION OF THE PRESENTLY PREFERRED EMBODIMENTS

Figure 1:
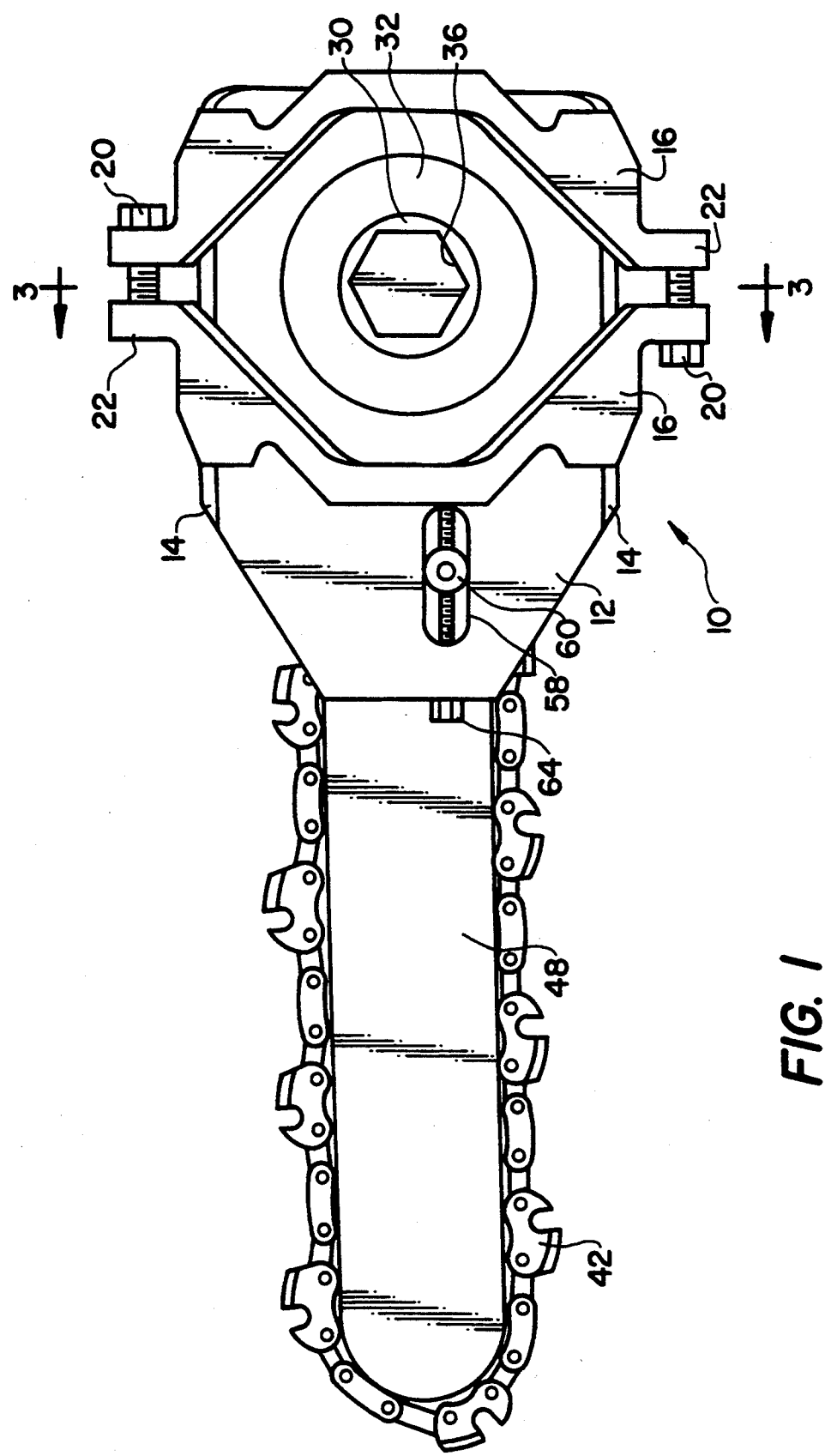
FIG. 1 is a top plan view of a radial arm saw mortising adapter and chain saw according to the present invention.

As seen in the drawings, a mortising adapter according to the present invention, generally indicated at 10, includes a base plate 12 having a flanged raceway 14 and a clamp bracket assembly which, in the illustrated embodiment comprises a pair of clamp brackets 16. At least one of the clamp brackets includes a flanged portion 18 for engaging with the base plate flanged raceway 14 and allowing the clamp bracket 16 to slide along the raceway 14. The two clamp brackets 16 are adjustably secured to each other by threaded fasteners 20 engaging threaded ears 22 of the clamp brackets 16 so that the clamp brackets can be clamped to a component of a radial arm saw, such as motor housing 24. In a preferred embodiment, the two clamp brackets 16 are substantively identical for ease in manufacturing and simplicity of inventory control. By threading only one ear 22 of each bracket 16, two substantively identical clamp brackets 16 can be secured to each other by threaded fasteners 20 with both clamp brackets 16 engageable with and slidable along base plate raceway 14. The clamp brackets 16 may also be secured to each other by any other known means.

A drive spindle 30 is rotatably mounted to the base plate 12 by a bearing 32 mounted in bore 34. The bearing 32 is preferably of a sealed caged roller bearing type, but any suitable type of bearing may be used. The drive spindle 30 includes a hexagonal socket 36 for engaging a hexagonal portion of an arbor 38 of the radial arm saw motor 24 and a toothed portion 40 for engaging a chain saw 42. Preferably, the toothed portion 40 is formed so as to engage a conventional chain saw, thereby allowing the use of readily available chain saws. However, the toothed portion 40 can be formed to any desirable shape. The drive spindle also preferably includes bore 44 in the toothed portion 40 for accepting a threaded portion 46 of arbor 38 which is smaller in diameter than the distance between opposing faces of the hexagonal shoulder of the radial saw arbor. This allows for the use of a smaller diameter toothed portion of drive spindle 30 and a narrower width chain saw blade while not increasing the necessary length of the drive spindle 30, thereby providing a more compact mortising adapter 10. The bore 44 need not completely pass through the toothed portion 40 as shown but can only pass through a portion of the toothed portion 40.

Since the translational position of the drive spindle 30 is fixed with respect to the base plate 12, the adjustability of the clamp brackets 16 along raceway 14 allows base plate 12 and drive spindle 30 to be adjusted with respect to the radial arm saw motor 24 to align the axis of rotation of the drive spindle to generally coincide with the axis of rotation of the radial arm saw arbor prior to and after clamping the clamp brackets 16 to the radial arm saw motor 24.

Figure 2:
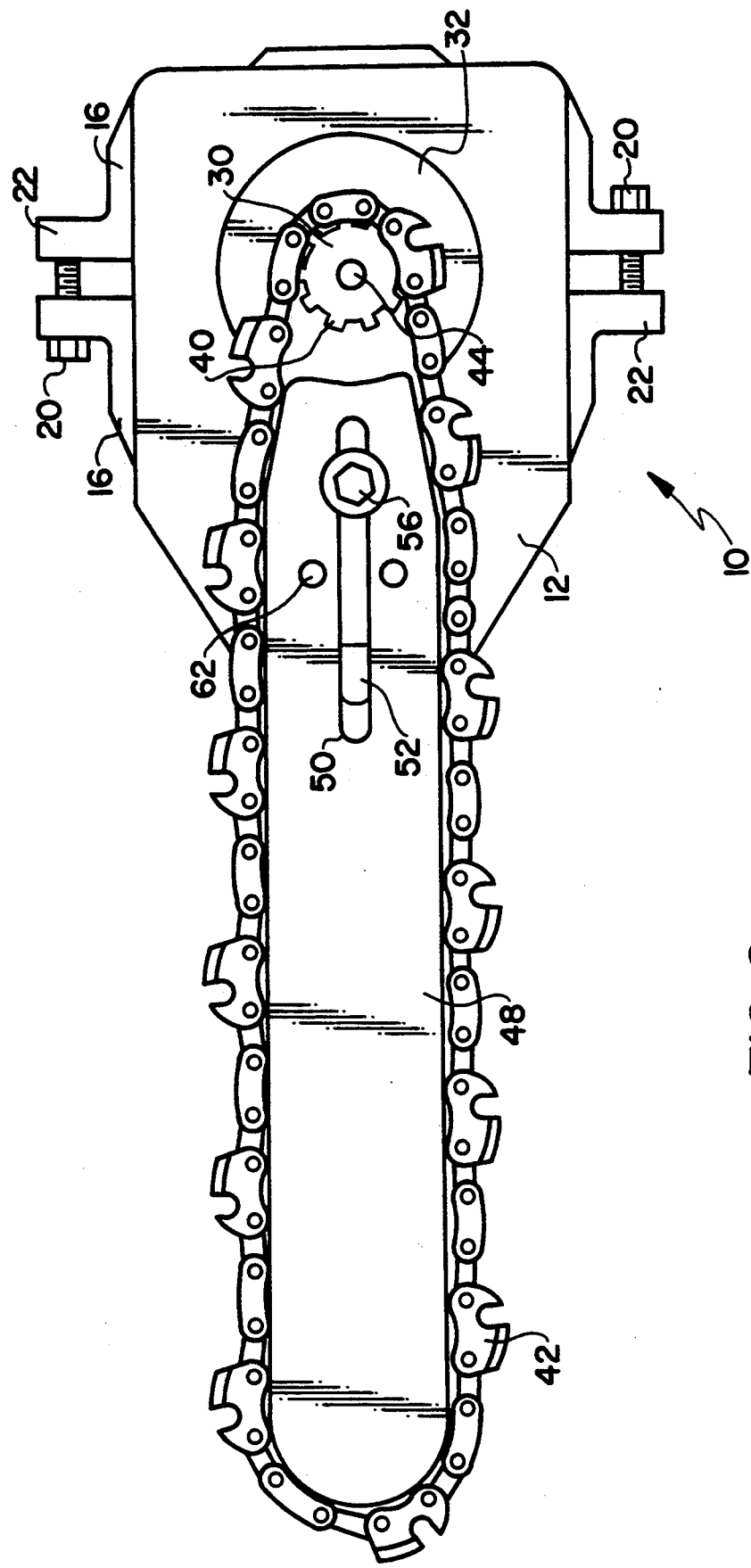
FIG. 2 is a bottom plan view of the adapter and chain saw of FIG. 1.

Chain saw blade 48 includes slot 50 for engaging with a locating boss 52 and is attached to a raised portion 54 of the base plate 12 by bolt 56 which engages a threaded hole in the base plate 12. The raised portion 54 provides clearance between the chain saw 42 and the base plate 12 when the chain saw 42 and blade 48 are mounted to the base plate 12. The base plate 12 also includes an adjusting slot 58 for receiving adjusting block 60 (shown in FIG. 1 and in phantom in FIGS. 2 and 4). Adjusting block 60 includes one raised pin 62 for engaging a corresponding hole or recess in blade 48 although, alternatively, this raised pin may be replaced by a bolt or screw threaded into block 60. The adjustment block 60 is slidable in adjusting slot 58 parallel to the longitudinal axis of the blade 48 and runs parallel to the blade adjustment slot 50. Thus, the adjustment screw 64, can be rotated to move the adjustment block 60 and chain blade 48 away from drive spindle 30 to remove any slack and adjust the tension in the chain saw 42 engaged with the drive spindle 30 and the chain saw blade 48. When the desired tension in the chain saw 42 is achieved, the chain saw blade 48 can be locked in the properly adjusted position by bolt 56. As with the chain saw 42, the chain saw blade 48 is preferably of a readily available conventional type or alternatively, can also be of any type desired.

After mounting a chain saw and blade to the mortising adapter and adjusting the tension in the chain, the mortising adapter is clamped to a radial arm saw and is ready to cut mortises by turning on the radial arm saw to drive the chain saw.

In an alternative embodiment, the chain saw blade 48 and chain saw 42 can be mounted on the other side of the base plate so as to be mounted between the radial arm saw motor 24 and the base plate 12. The mounting would be similar to the above mounting and may allow the mortising adapter to be even more compact and more stable as a result of mounting the chain saw closer to the radial arm saw motor, and reducing the effective driving length of the motor arbor. In this embodiment, the hexagonal socket portion can pass entirely through the drive spindle 30, with the toothed portion 40 of the drive spindle being positioned between the base plate 12 and the motor 24. Depending on the size of the motor arbor, this alternative may require a wider chain saw blade than the previously described embodiment to provide for proper engagement between the drive spindle, chain saw and chain saw blade.

It will be appreciated that the various components described above can be constructed of any suitable material(s), including steel, iron, aluminum and other metals as well as ceramics, plastics and composites. Also, the sizes and shapes of the components can be altered as desired. Furthermore, while the inventive adapter has been described above as mountable to a radial arm saw, it is to be appreciated that the mortising adapter of the invention can be mounted to any power tool having an arbor that terminates in a shaped end which corresponds in size and shape to the socket in the drive spindle of the mortising adapter. In addition, while the adapter and arbor have been described as having a complementary hexagonal shape, it is to be appreciated that other complementary multi-sided or splined shapes could be provided without departing from this invention.

Thus, while the invention has been described in accordance with what is presently believed to be the most practical and preferred embodiment, it is to be understood that the invention is not to be limited to the disclosed embodiments but on the contrary, is intended to cover various modifications and equivalent arrangements included within the spirit and the scope of the appended claims, which claims are to be interpreted in the broadest manner so as to encompass all such equivalent structures.

What is claimed is:

1. A device for operatively coupling a chain saw blade to a power tool so that a chain saw on the blade is driven by a motor of the power tool, said device comprising:
    a base plate, said base plate including a flanged raceway which runs generally parallel to a longitudinal axis of the base plate;
    a drive spindle rotatably mounted to the base plate for rotation about a fixed axis generally perpendicular to a side face of the base plate, the drive spindle including a mechanism for directly and detachably coupling the drive spindle to an arbor of the power tool so that the power tool rotatably drives the drive spindle;
    a clamp mechanism for detachably securing the base plate to a component of the power tool, said clamp mechanism comprising a clamp bracket assembly for providing a clamping force on the component of the power tool, said clamp bracket assembly comprising two clamp brackets and permitting centering of said drive spindle on said arbor, at least one of the clamp brackets including a flanged portion for slideably engaging the flanged raceway of the base plate;
    a mechanism for adjustably and detachably mounting a chain saw blade and chain saw to the base plate such that 1) the chain saw engages and is driven by the drive spindle to move in a plane generally parallel to the side face of the base plate, 2) the chain saw blade is mounted such that a longitudinal axis of the chain saw blade intersects the axis of rotation of the drive spindle and is generally parallel to the longitudinal axis of the base plate and 3) the chain saw blade can be selectively adjusted in a direction generally parallel to the longitudinal axis of the chain saw blade to remove slack and vary tension on the chain saw engaged between the chain saw blade and the drive spindle.

2. A device as in claim 1, in combination with a chain saw and a chain saw blade.

3. A device as in claim 1, wherein each of the clamp brackets includes a corresponding flanged portion for slideably engaging the flanged raceway of the base plate.

4. A device as in claim 3, in combination with a chain saw and a chain saw blade.

5. A device as in claim 1, wherein the mechanism for directly and detachably coupling the drive spindle to the arbor of the power tool includes a shaped socket portion on the drive spindle for engaging a complementarily shaped portion of the arbor.

6. A device as in claim 5, wherein said socket portion is hexagonally shaped.

7. A device as in claim 5, wherein the drive spindle further comprises a bore adjacent the shaped socket portion for receiving a threaded portion of the arbor.

8. A device as in claim 7, in combination with a chain saw and a chain saw blade.

9. A device as in claim 1, wherein the mechanism for directly and detachably coupling the drive spindle to an arbor of the power tool includes a shaped socket portion on the drive spindle for engaging a complementarily shaped portion of the arbor.

10. A device as in claim 9, wherein said socket portion is hexagonally shaped.

11. A device as in claim 9, wherein the drive spindle further comprises a bore adjacent the shaped socket portion for receiving a threaded portion of the arbor.

12. A device as in claim 1, wherein the two clamp brackets are adjustably secured to each other such that a distance between the two clamp brackets can be adjusted to provide a clamping force on the motor.

13. A device as in claim 2, wherein the two clamp brackets are adjustably secured to each other such that a distance between the two clamp brackets can be adjusted to provide a clamping force on the motor.

14. A drive spindle for rotationally transmitting power from an arbor of a motor to a chain saw, comprising:
a shaped socket portion for engaging a complementarily shaped portion of the motor arbor; and
a bore adjacent the socket portion for receiving a threaded portion of the motor arbor, the bore having a diameter smaller than a distance between two opposing sides of the shaped portion of the motor arbor;
a base plate for rotatably mounting the drive spindle about a fixed axis generally perpendicular to a side face of the base plate so that the motor arbor engages and rotatably drives the drive spindle;
a clamp mechanism for detachable securing the base plate to the motor and for permitting centering of said drive spindle with respect to said arbor, the clamp mechanism comprising a first clamp bracket and a second clamp bracket adjustably secured to each other such that a distance between the two clamp brackets can be adjusted to provide a clamping force on the motor, both clamp brackets also being adjustably secured to the base plate such that the base plate can be adjusted with respect to the motor to align the axis of rotation of the drive spindle to generally coincide with an axis of rotation of the motor arbor when the base plate is clamped to the motor.

15. A device as in claim 14, wherein said socket portion is hexagonally shaped.

16. A device as in claim 14, further comprising a mechanism for adjustably and detachably mounting a chain saw blade and chain saw to the base plate such that 1) the chain saw engages and is driven by the drive spindle to move in a plane generally parallel to the side face of the base plate, 2) the chain saw blade is mounted such that a longitudinal axis of the chain saw blade intersects the axis of rotation of the drive spindle and is generally parallel to a longitudinal axis of the base plate and 3) the chain saw blade can be selectively adjusted in a direction generally parallel to the longitudinal axis of the chain saw blade to remove slack. and vary tension on the chain saw engaged between the chain saw blade and the drive spindle.

17. A device as in claim 16, wherein the motor is part of a radial arm saw.

18. A device as in claim 16, in combination with a chain saw and a chain saw blade.

19. A device as in claim 17, wherein the base plate further includes a flanged raceway which runs generally parallel to the longitudinal axis of the base plate and at least one of the clamp brackets includes a corresponding flanged portion for slideably engaging the flanged raceway of the base plate.

* * * * *